Nov. 13, 1962  H. W. GUETTLER  3,063,362
TWO-APRON PRESS
Filed Oct. 27, 1959  10 Sheets-Sheet 1

Fig. 1

INVENTOR.
HERBERT W. GUETTLER
BY
ATTORNEY

Nov. 13, 1962 H. W. GUETTLER 3,063,362
TWO-APRON PRESS
Filed Oct. 27, 1959 10 Sheets-Sheet 2

INVENTOR.
HERBERT W. GUETTLER

INVENTOR.
HERBERT W. GUETTLER
BY
ATTORNEY

Nov. 13, 1962  H. W. GUETTLER  3,063,362
TWO-APRON PRESS
Filed Oct. 27, 1959  10 Sheets-Sheet 4

FIG. 9

INVENTOR.
HERBERT W. GUETTLER
BY
A. Dunham Owen
ATTORNEY

Nov. 13, 1962  H. W. GUETTLER  3,063,362
TWO-APRON PRESS

Filed Oct. 27, 1959  10 Sheets-Sheet 5

INVENTOR.
HERBERT W. GUETTLER
BY
ATTORNEY

Nov. 13, 1962 H. W. GUETTLER 3,063,362
TWO-APRON PRESS
Filed Oct. 27, 1959 10 Sheets-Sheet 6

INVENTOR.
HERBERT W. GUETTLER
BY
ATTORNEY

Nov. 13, 1962  H. W. GUETTLER  3,063,362
TWO-APRON PRESS
Filed Oct. 27, 1959  10 Sheets-Sheet 7

INVENTOR.
HERBERT W. GUETTLER
BY
A. Dunham Owen
ATTORNEY

Nov. 13, 1962 H. W. GUETTLER 3,063,362
TWO-APRON PRESS
Filed Oct. 27, 1959 10 Sheets-Sheet 9

INVENTOR.
HERBERT W. GUETTLER
BY
ATTORNEY

Nov. 13, 1962 H. W. GUETTLER 3,063,362
TWO-APRON PRESS
Filed Oct. 27, 1959 10 Sheets-Sheet 10

INVENTOR.
HERBERT W. GUETTLER
BY
ATTORNEY

United States Patent Office 3,063,362
Patented Nov. 13, 1962

3,063,362
TWO-APRON PRESS
Herbert W. Guettler, 2901 Vallejo St.,
San Francisco 23, Calif.
Filed Oct. 27, 1959, Ser. No. 849,088
12 Claims. (Cl. 100—154)

This invention relates to improvements in apron-type presses.

Various industrial processes produce waste materials containing considerable amounts of moisture. In many instances the waste material has utility if its water content is drastically reduced. For example, in paper mills large quantities of very wet bark are removed from logs; withdrawal of most of the contained moisture renders the bark useful as fuel. As another example, wet cellulose pulp can be made valuable by squeezing out the contained liquor.

Apron-type presses have been devised for squeezing out the liquid content of solids, and the instant invention presents improvements in such presses.

In apron-type presses heretofore in use, a single perforate apron was wrapped around a substantial portion of the circumference of a large-diameter imperforate cylinder. The apron was urged in toward the cylinder under considerable pressure to squeeze out the water from wet waste material carried by the apron between itself and the cylinder. The squeezed-out water fell through the apron, leaving the waste material much drier.

For many uses this type of apron-cylinder press is very satisfactory, particularly when a press like that in my U.S. Patent 2,711,130 is used. However, when slippery material such as cellulose pulp is fed between the apron and the cylinder, the material tends to slip to the point where it is very difficult to put the material through the press.

Short-fiber material also causes trouble with prior-art apron presses. For example, fine fibers like pulp are so small that they fall down through the openings provided between the links in the aprons heretofore known. These are the openings that have heretofore been relied on to carry out the water, and for coarse-fiber material this structure has been generally satisfactory, but it is not satisfactory for the fine-fiber material for such material is simply carried away with the squeezed-out water.

Heretofore, apron presses have simply let the pressed-out material drop off the apron at the end of the run where the apron goes around a roller. This has also caused trouble when fine material, such as paper pulp, is being squeezed out, for the bulk of such material tends to fall between the ends of the links as they open up when they go around the sprocket.

Another problem with apron presses is to confine the material at the sides, to keep material from falling out at the edges.

The present invention has solved all these problems. It provides a press having no drum or cylinder; instead, two endless aprons are used, an upper imperforate one and a lower perforate one. The links of the lower apron lie close together, and small perforations, only about ⅛" in diameter, are provided through the lower apron to give the water a through-passage that even short fibers cannot flow through. At each side of the apron, novel means is provided for containing the material at the edges; and at the end of the pressure run, the bottom apron is held flat while scraper means removes the solid material before it reaches the end of the lower run of the apron.

Other objects and advantages of the invention will appear from the following description of some preferred embodiments thereof.

FIGS. 1-4 show one form of twin-apron press 30 embodying the principles of the invention. Bark, pulp, or any other wet fibrous material 31 enters the press 30 at a hopper 32 and falls onto a flat entering portion 33 of the upper run 34 of a bottom apron 35. The material 31 rides on the apron 35 and is pressed between the bottom apron 35 and a top apron 36. The bottom apron 35 may be driven by a series of sprockets 37 mounted on a shaft 38, while the upper apron 36 is driven by similar sprockets 40 mounted on a shaft 41. The shaft 38 drives the shaft 41 through gears 42 and 43 and is driven by any suitable power means, such as the motor 44 and gears 44ª and 44ᵇ.

Figure 1:
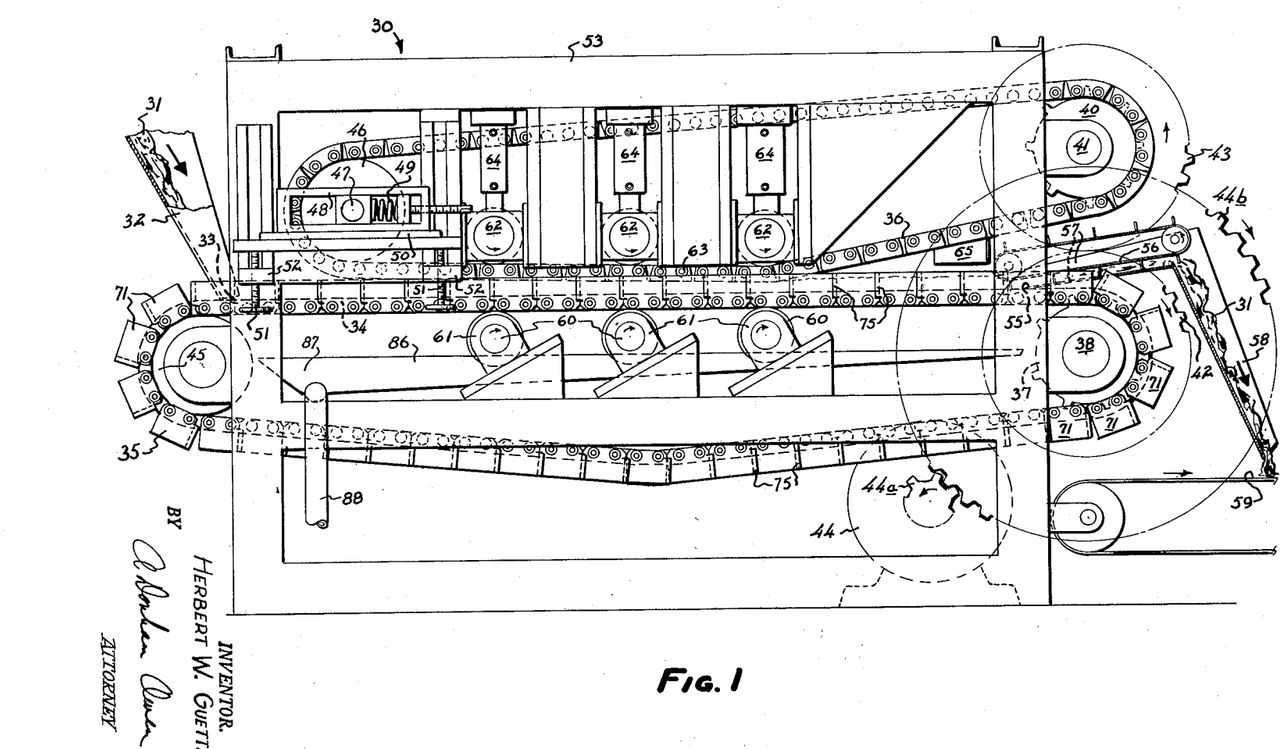
FIG. 1 is a view in side elevation and partly in section of a two-apron press embodying the principles of the invention.
Figure 2:
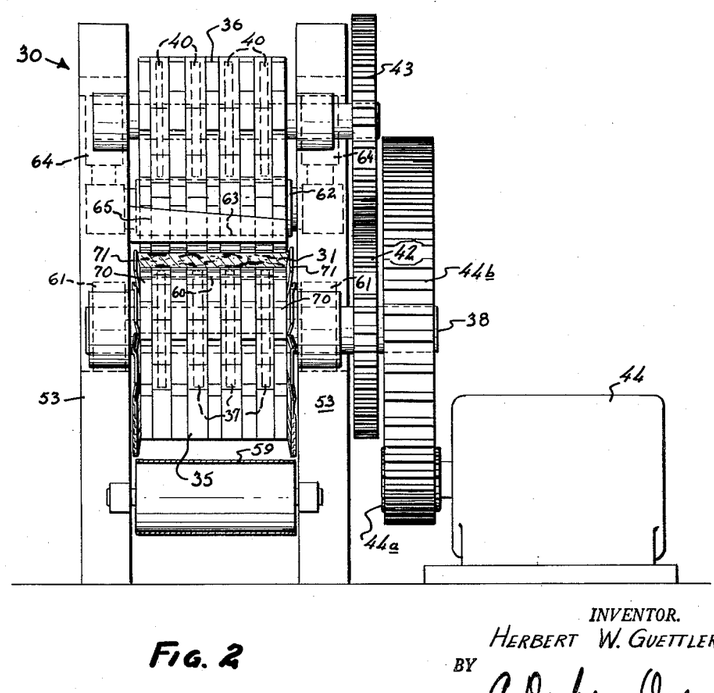
FIG. 2 is a view in end elevation of the press of FIG. 1, looking at its right-hand or discharge end, with the scraper and end chute removed.
Figure 3:
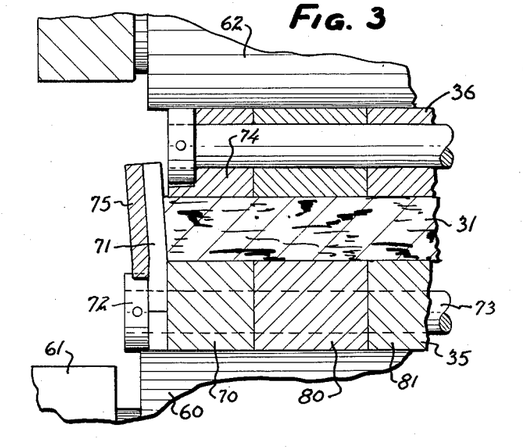
FIG. 3 is an enlarged fragmentary view in elevation and in section along the line 3—3 in FIG. 4, through a side edge portion of the two aprons with the wet material being squeezed between them, showing one form of side-retaining means attached to the bottom apron.
Figure 4:
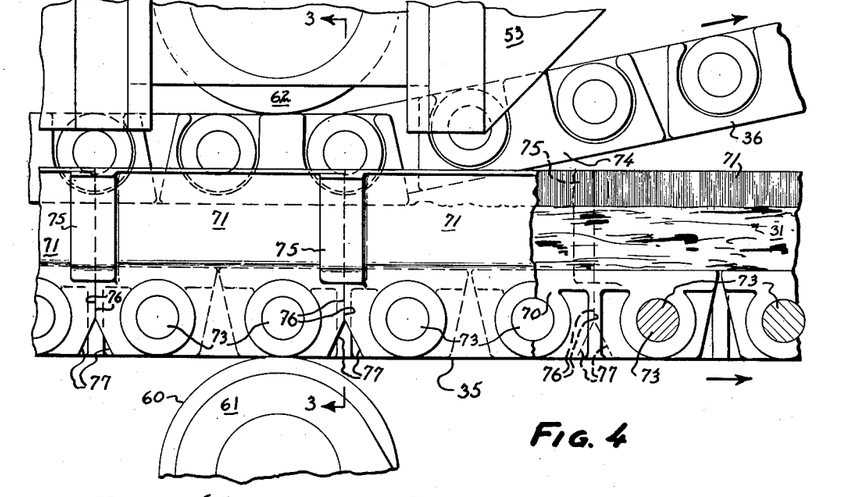
FIG. 4 is a fragmentary view in side elevation and partially in section, on the scale of FIG. 3, showing how the side-retaining means of the lower links overlap.

The lower apron 35 runs over an idler roll 45, while the upper apron 36 runs over an idler roll 46. The hopper 32 empties on the apron portion 33 between the idler rolls 45 and 46, the purpose being to feed the material 31 in only after the lower apron 35 has become flat and before it engages the upper apron 36. The upper idler roll 46 runs on a shaft 47 that is supported in a take-up bearing assembly 48 with spring means 49, which keeps the upper apron 36 tight. The take-up bearings 48 are mounted on a base plate 50 which can be moved up and down by screws 51 that screw into a bracket 52 on the main frame 53 to vary the distance between the aprons 35 and 36 at the entrance for the material 31 into the press 30.

As has been mentioned before, prior-art aprons discharged the pressed material over the end of the lower apron, where it passed over the sprockets. While this is satisfactory, for coarse material, and may, if desired, be used in this invention when coarse material is being pressed, it is not satisfactory for fine materials. With fine fibers such as are found in pulp, a large proportion of the material tends to fall in between the ends of the links as they open up, when they go around the sprocket. For this reason, in the present invention the bottom apron 35 is held substantially flat during all the time that the mat 31 is on it, and the material 31 is removed by a scraper 55, which may scrape the material into a conveyer 56 which rides in a trough 57, from which it falls into a hopper 58 and down onto a conveyer 59, for subsequent treatment, use, or disposal.

It should be noted that the bottom apron 35 runs over a series of rotatably mounted supporting rolls 60. The rolls 60 are journaled in fixed bearings 61 and are not pressure rolls, for pressure rolls tend to spread the links apart so that short fibers can fall through; instead, the axes of the rolls 60 remain stationary; there is no up-and-down movement in the rolls 60. Pressure rolls 62 do press against the lower strand 63 of the top apron 36, urged by hydraulic cylinders 64, for the top apron 36 is imperforate. In an alternative, though less desirable, form of construction, the upper run of the lower apron may be supported by pressure rolls, and the lower run of the upper apron may have fixed-bearing rollers engaging its upper surface. A scraper 65 removes such fibers as adhere to the top apron 36, so that they fall onto the lower apron 35.

Figure 6:
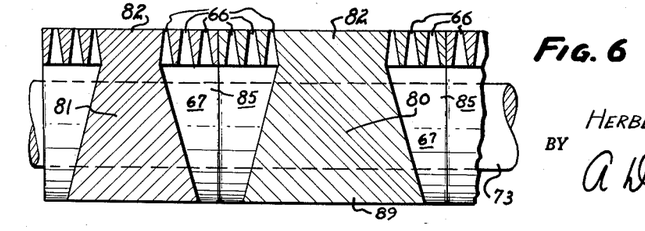
FIG. 6 is a view in section taken parallel to FIG. 3 and along the line 6—6 in FIG. 7, through two adjacent links, a drive-like on the right and an intermediate link on the left.

As stated earlier, it is not feasible with fine fibers to have wide slots between the adjoining links or the succeeding links. Instead, small perforations 66 (see FIG. 6) of about ⅛" diameter in the bottom apron 35 let the water out. Preferably, as shown in FIG. 6, the perforations 66 flare downwardly and outwardly, and groups of them join into enlarged recesses 67 that extend up from the bottom of the apron 36.

At the sides of the aprons 35 and 36 it is not feasible to use stationary retaining plates when small-fiber material is being pressed, for the fibers tend to go out along with the water through the clearance between the plates and the aprons. Consequently, in the present invention the retaining means move with one of the aprons 35, 36.

In FIGS. 1–4 the lower apron 35 is provided with outside links 70 to which side plates 71 are attached, as by a nut 72 on the bolts 73, which hold the links of the apron 35 together. The plates 71 extend up above the lower half of the imperforate upper apron links 74 and form, on the straight upper run 34 of the apron 35, a continuous wall which prevents the fibers from floating out. As an added precaution, an overlap plate 75 may be welded to each side plate 71, to overlap the adjacent plate 71 on the outside. The ends 76 of each plate 71 have inclined lower portions 77 (FIG. 4) for clearance when the plates 71 go around the sprocket 37 and the idler roll 45.

Figure 5:
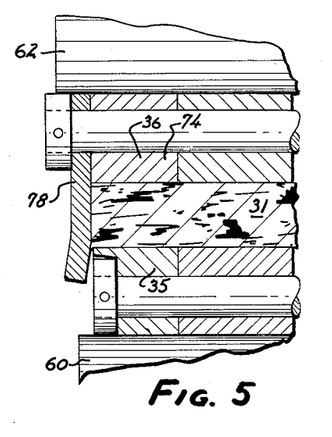
FIG. 5 is a view similar to FIG. 3 showing a modified form of side-retaining means.

FIG. 5 shows a similar arrangement but, instead of having the retaining plates 70 attached to the lower apron 35, similar plates 78 are similarly attached to the upper apron 36.

As stated earlier, when pressing fine fibers like pulp, the openings between the links of the lower apron 35 cannot be large enough to carry away all the water to be drawn off, but the apron 35 must be perforated. FIG. 6 shows a section through a drive link 80 and an intermediate link 81, the two types of links alternating across the width of the apron 35.

Figure 7:
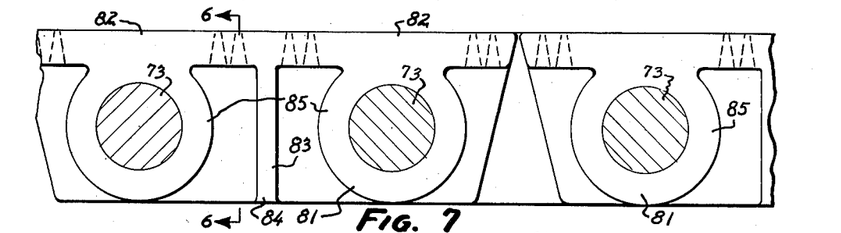
FIG. 7 is a fragmentary view in side elevation and partly in section of portions of a pair of intermediate links.
Figure 8:
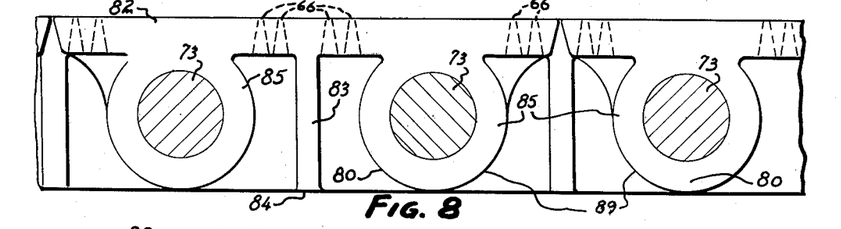
FIG. 8 is a similar view in side elevation of portions of a pair of drive links.

FIGS. 7 and 8 are views in side elevation, respectively, of an intermediate link 81 and a drive link 80. As will be seen, both links 80 and 81 are T-shaped in cross section with a top portion 82 and a vertical stem 83 that is slightly wider at the bottom 84 to help provide enough contact surface for engagement with the supporting rolls 60. The links 80 and 81 both flare downwardly and outwardly, as shown in FIG. 6, and the drive links 80 are wider than the intermediate links 81 to provide sufficient pressure surface 89 for engagement by the sprocket teeth 37. The top portions 82 of the links 80 and 81 are both provided with drainage holes 66, which are small enough to hold back fibers. Sleeve portions 85 reinforce the links 80 and 81 and receive the bolts 73.

The water or other liquid squeezed out from the material 31 falls down through the openings 66 and preferably is collected in a drain pan 86. Preferably, the pan 86 is slightly tilted toward one end 87 where an outlet pipe 88 conducts the liquid away to a drain or elsewhere. Preferably, the pan 86 is located between the upper and lower runs of the lower belt 35 and is wide enough and long enough to collect all the squeezed-out liquid.

This two-apron press 30 has many advantages over an apron cylinder process. For one thing, any number of pressure zones can be provided, by providing the desired number of rollers 60 and 62. For another, the discharge of the dried material 31 is easier, because all the links are flat on top, so that the material can be plowed off a flat surface, instead of having to fall off a curved surface. Furthermore, the retaining arrangement at the sides of the aprons 35 and 36 can be made more effective than in the apron cylinder press. Still further, the whole press 30 is lower and more accessible than an apron cylinder press.

FIGS. 9–12 show a press 100, generally like the press 30, but with a different kind of side retaining means, comprising two continuous flexible belts 101, one on each side of the two aprons 102 and 103, running around pulleys 104 at each end. The pulleys 104 have bottom flanges 105 and rotate on vertical shafts 106 in sliding bearings 107. Springs 108 urged against the bearings 107 keep the belts 101 pressed against the sides of the aprons 102 and 103. The belts 101 are frictionally driven by the aprons 102 and 103 and thus move at the same speed as the aprons. The belts 101 confine material 109 between the aprons 102 and 103 from an entrance 110 to a point 111 where the material is removed from the aprons by a scraper 112 and plowed into chutes 113 and 114 and then onto a conveyer 115. It will be noted that the belts 101 are wide enough to overlap both the press runs of the aprons 102 and 103 even when they are furthest apart. Pulleys 116 of smaller diameter, generally like the pulleys 104 and mounted similarly, may be placed between the pulleys 104 for additional pressure against the aprons, as shown in FIG. 10A.

Figure 9:
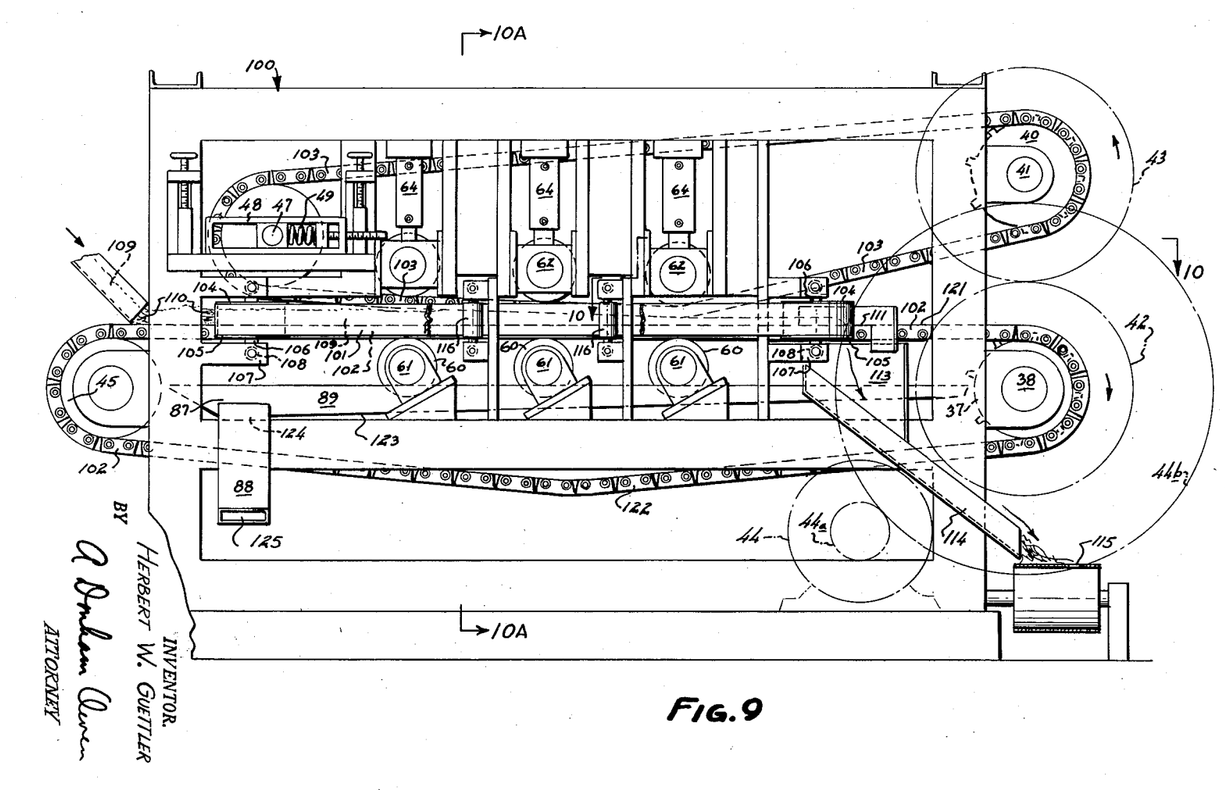
FIG. 9 is a view similar to FIG. 1 of a modified form of two-apron press having a different kind of material-retaining means along its sides.
Figure 10:
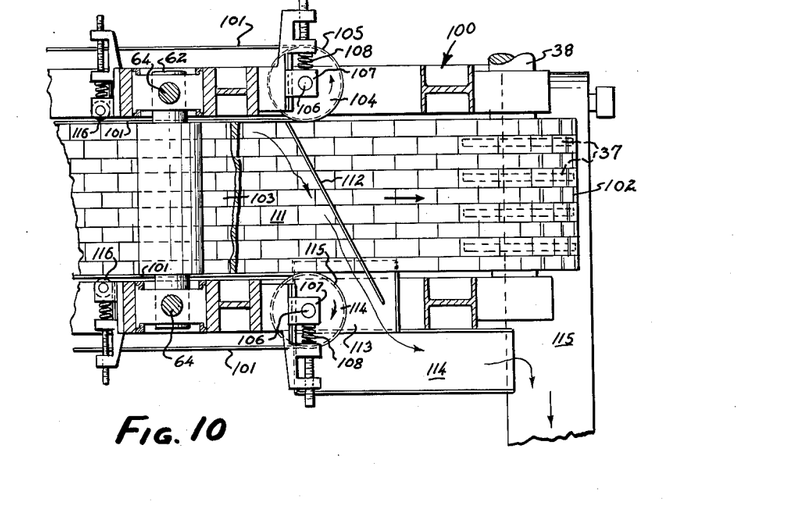
FIG. 10 is a view in section taken along the line 10—10 in FIG. 9.
Figure 10A:
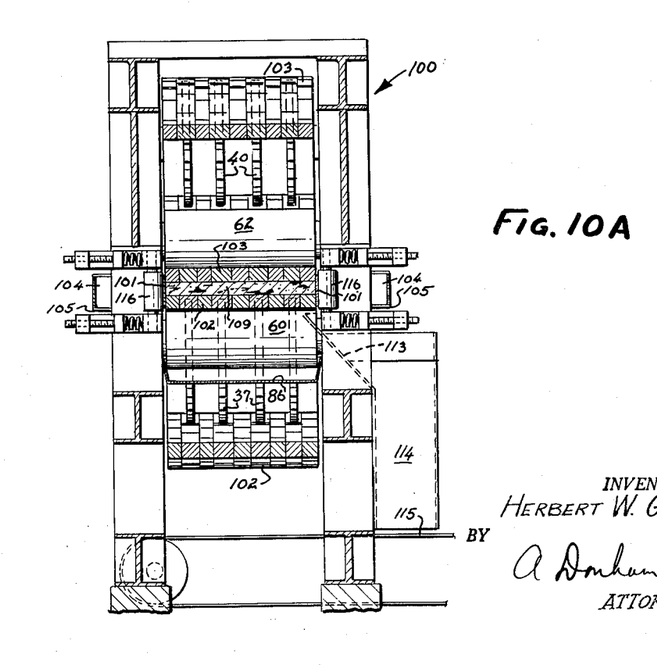
FIG. 10A is a view in section taken along the line 10A—10A in FIG. 9.
Figure 11:
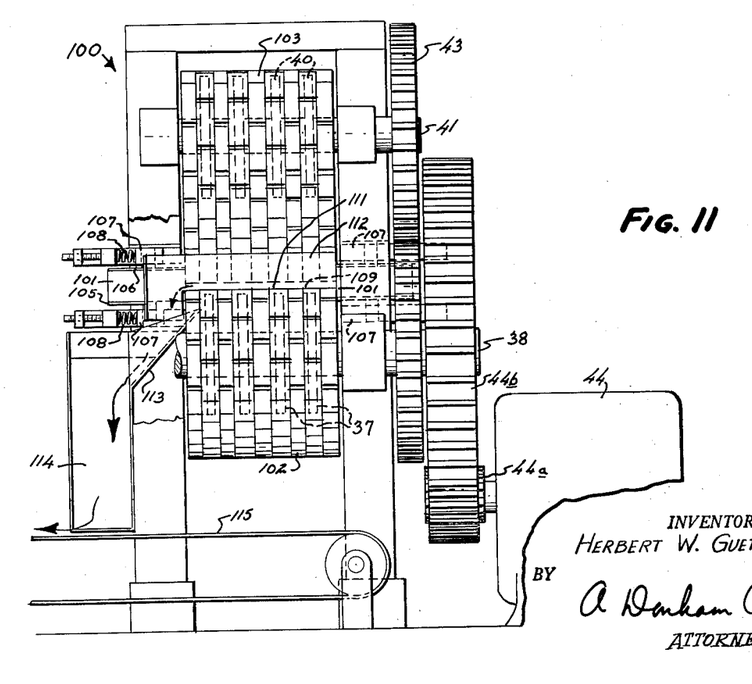
FIG. 11 is a view in end elevation looking at the press of FIG. 9 from the right-hand or discharge end and showing means for scraping up the pressed material and moving it out at one side of the press.
Figure 12:
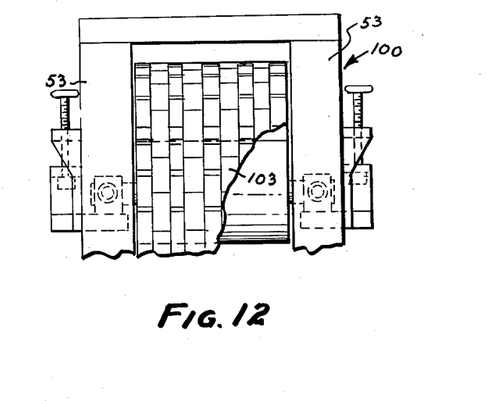
FIG. 12 is a fragmentary view in end elevation, partially broken away, of the left-hand end of the press of FIG. 9, showing a lifting mechanism for the idler roll.

FIGS. 9 and 12 show an up-and-down adjustment arrangement of the feed end of the top apron 103, as done from the top instead of from the bottom, as shown in FIG. 1. Otherwise, the belts 101 would interfere with adjustment screws located at the bottom. Otherwise, the arrangement is the same and the same reference numerals are used.

Where wet bark is treated and only water is removed, the water can run through both the top and bottom runs of the bottom apron 102 into a pit and thereby into a sewer. But where pulp is being squeezed and where the liquid is to be recovered, the liquid is a sticky material and it is important to remove the liquid after it has passed through the top strand 121 of the lower apron 102 and before it touches the bottom run 122 of the same apron. For such purposes, a pan 123 is provided between the runs 121 and 122 for collecting the liquid. The pan 123 has an outlet opening 124 connecting with a discharge pipe 125 leading to a liquor-storage tank (not shown).

Figure 13:
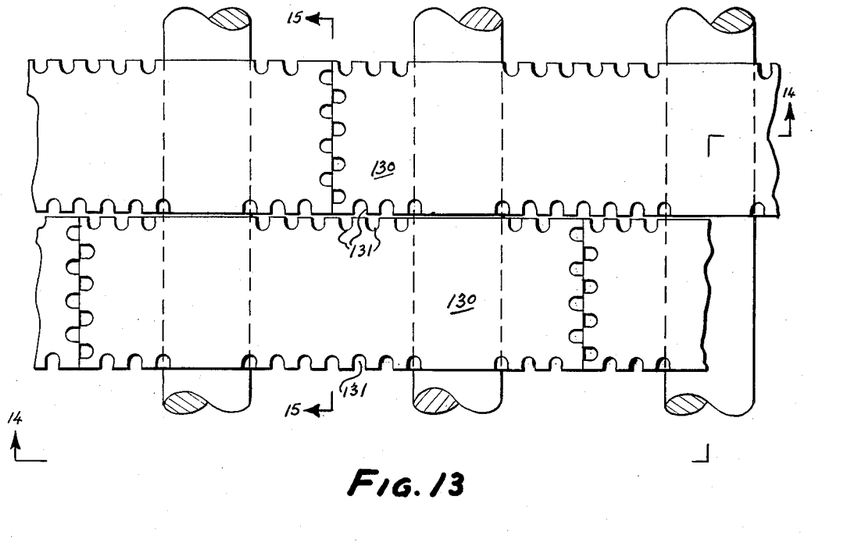
FIG. 13 is a fragmentary top plan view of part of a modified form of bottom apron, showing an alternate form of opening through the aprons.
Figure 14:
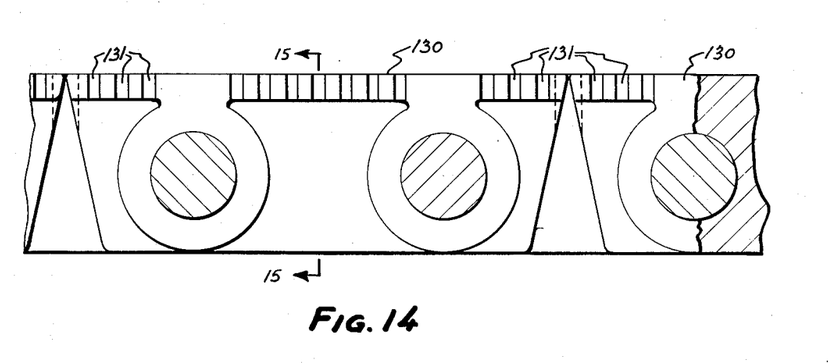
FIG. 14 is a view in side elevation of portions of one pair of links of FIG. 13.
Figure 15:
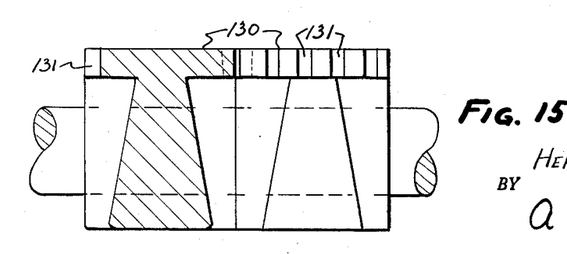
FIG. 15 is a view in section taken along the lines 15—15 in FIGS. 13 and 14.

Another kind of water-passing perforation is shown in FIGS. 13–15. Here links 130 have sides provided with indentations 131, which in the actual devices are no larger than 1/8" in diameter.

Figure 16:
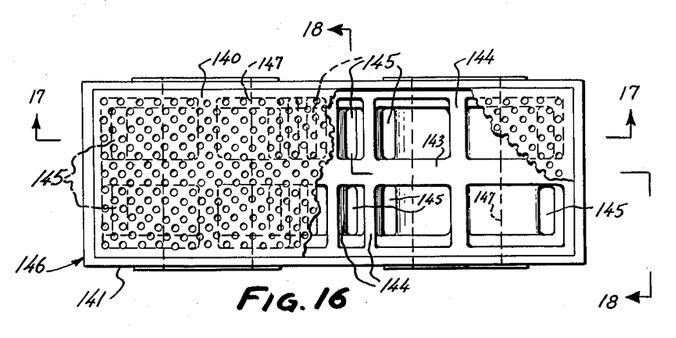
FIG. 16 is a top plan view, partly broken away, of another modified form of apron link, having a perforated top plate.
Figure 17:
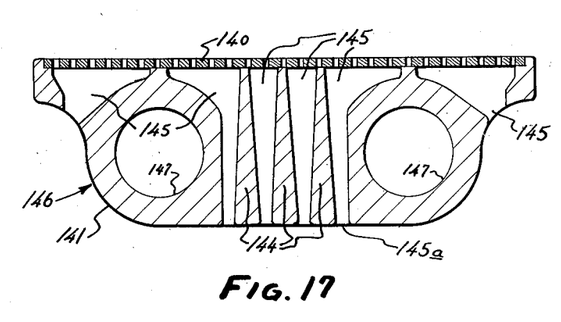
FIG. 17 is a view in side elevation and in section of a link of FIG. 16, taken along the line 17—17 in FIG. 16.
Figure 18:
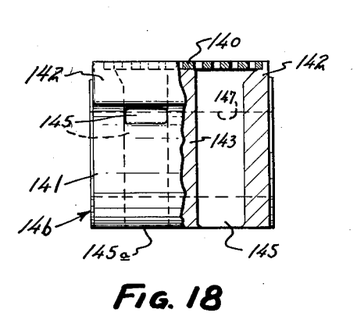
FIG. 18 is a view in end elevation and in section, taken along the line 18—18 in FIG. 16.

A third alternative form of perforation is shown in FIGS. 16, 17, and 18. Here a perforated plate 140 is fastened on top of a link 141, in this case a drive-link being shown. The perforated plate 140 is supported by the sides 142 of the link 141, with a longitudinal rib 143 and transverse ribs 144 forming several passages 145 for water to escape while, at the same time, retaining the necessary strength and pressure surface 145ª for the pressure rolls and a pressure surface 146 for the driving sprockets. The holes 147 are for bolts which connect the links 141 transversely.

A further modification of the invention is shown in FIGS. 19–22. There, a press 150 is shown with a general arrangement like the presses 30 and 100 but with some important differences. A frame 151 carries the stationary rollers 60 and the movable pressure rolls 62 as before, and again there are two aprons 152 and 153, but the links of these aprons are different.

Figure 19:
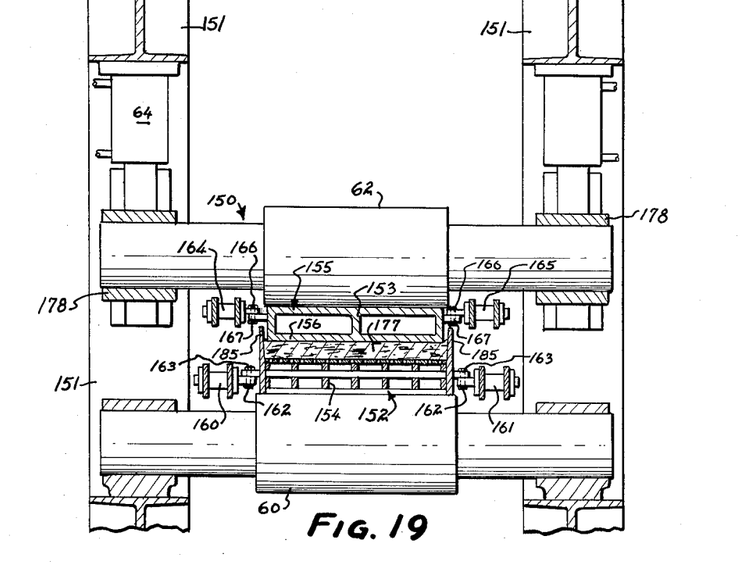
FIG. 19 is a view in end elevation and in section of another modified form of two-apron press having still different types of links.

The lower apron 152 comprises a series of large boxshaped links 154, each link extending the full width of the apron. Similarly, the upper apron 153 has links 155 with imperforate bottom surfaces 156 extending the full width of the apron 153.

Figure 20:
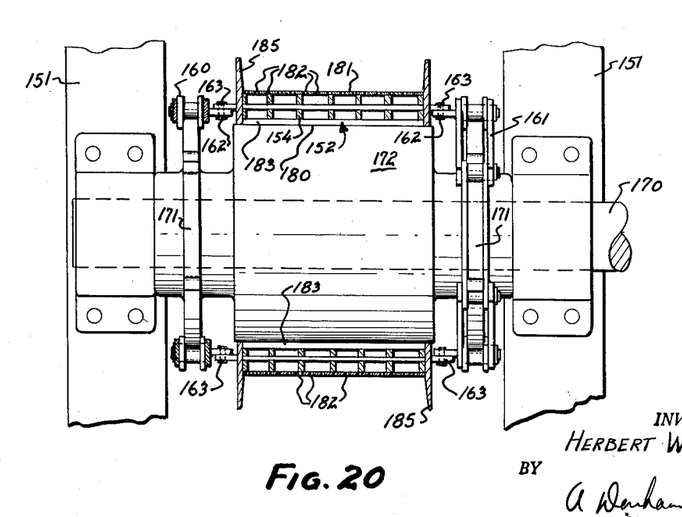
FIG. 20 is a fragmentary view in end elevation and partly in section taken through the lower apron of the press of FIG. 19 at its drive sprockets and supporting drum.

On each side of each apron 152 and 153 are drive chains. The apron 152 has drive chains 160 and 161 with lugs 162 fastened thereto and extending toward the apron 152. The links 154 have lugs 163 extending toward the chains 160 and 161 and (on the upper run) lying above the lugs 162 and fastened to them. Similarly, the apron 153 has drive chains 164 and 165 with chain lugs 166, and the links 155 have lugs 167 fastened to the lugs 166.

The chains 160 and 161 for the lower apron 152 are driven by a drive shaft 170 and sprockets 171, and the drive shaft 170 also supports a drum 172 that supports the apron 152 as it turns. The drive chains 164 and 165 for the upper apron 153 are similarly driven by sprockets (not shown) that are linked to the drive shaft 170 as by gears (not shown) and a similar supporting drum (not shown) for the apron 153 is also provided.

The pressure rolls 62 force the lower run of the upper apron 153 down against the mat 177 and toward the lower apron 152, sliding bearings 178 being forced down by pressure cylinders 64.

Figure 21:
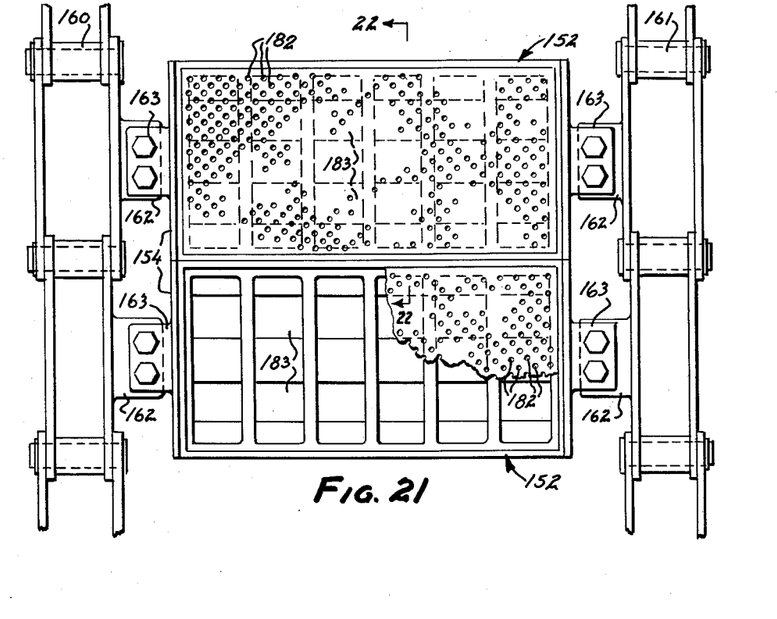
FIG. 21 is a top plan view of a link from the lower apron of the modification of FIGS. 19 and 20.
Figure 22:
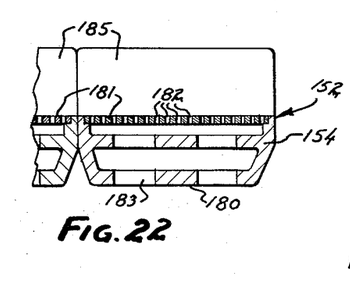
FIG. 22 is a view in section taken along the line 22—22 in FIG. 21.

The links 154 of the lower apron are formed like a grille, with flat lower walls 180 that ride over the stationary rollers 60 and a perforated upper plate 181 with small openings 182 therethrough. Side walls 185 extend up well above the lower surface of the upper apron 153 to retain the fiber mat 177. The liquid drains through the openings 182 and through passages 183 in the links 154.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An apron press comprising two aprons positioned one above the other so as to press material between them along an upper run of the lower apron, and a lower run of the upper apron; a series of rollers journaled in fixed bearings; a second series of pressure-urged rollers substantially thinner than the distance between the upper and lower runs of one said apron and journaled in individually sliding bearings, each roller extending full apron width, one said series of rollers supporting the upper run of said lower apron and one said series of rollers engaging the supper surface only of the lower run of said upper apron, hydraulic means for moving each sliding bearing individually, under pressure, toward its said run, each said apron being of link construction and having a separate drive shaft, both drive shafts being at the same end of said press, means for linking said drive shafts together and driving them at the same speed, and a plurality of drive sprockets on each said shaft directly engaging said aprons and constituting their sole driving means, said rollers all being idling rollers.

2. The press of claim 1 wherein each apron has several strands of links joined side by side, a plurality of strands of each apron being engaged by said drive sprockets.

3. An apron press comprising a pair of steel-link aprons positioned one above the other so as to press material between them along an upper run of the lower apron and a lower run of the upper apron, the upper said apron being imperforate and its lower run having a horizontal portion, the lower said apron being perforate for the passage of liquid therethrough and having its upper run horizontal and opposite the horizontal portion of said lower run of said upper apron and extending a substantial distance beyond it at both ends to provide a flat inlet portion and a flat outlet portion, a first series of rollers in fixed bearings, a second series of rollers, all said rollers being idler rollers driven only by contact with said apron and all said rollers extending the full width of their respective aprons, one said series of rollers supporting the upper run of said lower apron and one said series of rollers engaging the upper surface of the lower run of said upper apron, individual sliding bearings, one at each end of each said second series of rollers, in which each roller of said second series is individually mounted, said bearings each being slidable vertically a substantial distance, and individual hydraulic means for each sliding bearing at each end of each of said second series of rollers and outside said aprons each engaging a said sliding bearing and urging it toward the opposite apron to squeeze material between said aprons.

4. An apron press comprising a pair of steel-link aprons positioned one above the other, the upper said apron being imperforate and having a lower run with a horizontal portion and an inclined outlet portion, the lower said apron being perforate and having a horizontal upper run opposite the horizontal lower run of said upper apron and extending beyond it a substantial distance at both ends and beneath all of said inclined portion to provide an inlet portion and an outlet portion opposite said inclined portion, a feed hopper at said inlet means, a first series of rollers journaled in fixed bearings, a second series of rollers, all said rollers being idler rollers driven only by contact with said apron and all said rollers extending the full width of their respective aprons, one said series of rollers supporting the upper run of said lower apron and one said series of rollers engaging the upper surface of the lower run of said upper apron, individual sliding bearings, one at each end of each of said second series of rollers, in which each roller of said second series is individually mounted, said bearings each being slidable vertically a distance approximately as great as the diameter of its supported said roller; individual hydraulic means for each sliding bearing at each end of each of said second series of rollers and outside said aprons, each engaging a said sliding bearing and urging it toward the opposite apron to squeeze out liquid from material passing between said aprons and press said material, scraper means engaging the horizontal outlet portion of said lower apron and scooping up the pressed material, and conveyor means into which said material is scooped, said conveyor means moving in the same direction as the upper run of said lower apron to remove the pressed material from the lower apron while the apron is flat with the links close together so that the material cannot then drop between the links.

5. The press of claim 4 having in addition second scraper means between said lower apron and said inclined portion and in engagement with said upper apron.

6. An apron press comprising a pair of continuous steel-link aprons positioned one above the other so as to press material between them, the upper said apron being imperforate and the lower said apron being perforate; means providing a horizontal upper run of the said lower apron; means providing a horizontal lower run of said upper apron opposite said horizontal upper run; a first series of rollers in fixed bearings, a second series of rollers, all said rollers being idler rollers driven only by contact with said apron and all said rollers extending the full width of their respective aprons, one said series of rollers supporting said horizontal upper run of said lower apron and one said series of rollers engaging the upper surface of said horizontal lower run of said upper apron, individual sliding bearings, one at each end of each of said second series of rollers, in which each roller of said second series is individually mounted, each of said bearings being slidable vertically a substantial distance, individual hydraulic means for each sliding bearing at each end of each of said second series of rollers and outside said aprons, each engaging a said sliding bearing and urging it toward the opposite apron; single drive means for said aprons, comprising a drive shaft for each apron at the outlet end of said press, each shaft having drive sprockets engaging its apron across the width of said apron, gears linking said drive shafts together for common movement of said aprons at the same speed, and idler means at the opposite end of each apron from said drive means.

7. The press of claim 6, wherein the idler means for said upper apron comprises an idler drum, a vertically slidable bearing assembly in which said drum is rotatably mounted and is horizontally slidable, and spring means urging said idler drum horizontally against said upper apron, so that not only is said upper apron kept tight over its lower run but also the space between said aprons adjacent to said idler drum can be increased and decreased to provide a variable height inlet portion where material enters the press.

8. An apron press comprising a pair of aprons of identical width positioned one above the other, the upper said apron being imperforate and having a horizontal lower run, the lower said apron being perforate and having a horizontal upper run opposite the horizontal lower run of said upper apron, said press having an inlet portion and an outlet portion and pressure means for urging said lower run of said upper apron and said upper run of said lower apron together to squeeze material therebetween; drive means for driving said aprons at the same speed; an endless belt on each side of the aprons along said horizontal runs between said inlet and outlet portions, driven by friction from the aprons at the same speed as said aprons, for confining the material between said aprons; a series of rolls alongside each belt, for substantially its full length, mounted in horizontally sliding bearings; and pressure means acting on said rolls to press said rolls against said belts and toward said aprons.

9. The press of claim 8, wherein said belts overlap both said aprons at said inlet portion.

10. An apron press comprising a pair of aprons of identical width positioned one above the other, each consisting of several chain strands, the upper said apron being imperforate and having a horizontal lower run, the links of the lower said apron being perforate and having a horizontal upper run opposite the horizontal lower run of said upper apron, said press having an inlet portion and an outlet portion and pressure means for urging said lower run of said upper apron and said upper run of said lower apron together to squeeze material therebetween; drive means for driving said aprons at the same speed; an endless belt on each side of the aprons along said horizontal runs between said inlet and outlet portions, for confining the material between said aprons; and spring-loaded rollers holding said belts against said aprons so that said belts are driven, by friction, from said aprons.

11. The press of claim 10, wherein said belts extend from the said beginning of said inlet portion to the end of said outlet portion and said lower apron has a horizontal portion extending beyond said belts at each end.

12. An apron press comprising a pair of steel-link aprons of substantially identical width positioned one above the other, the upper said apron being imperforate and having a horizontal lower run, the lower said apron being perforate and having a horizontal upper run opposite the horizontal lower run of said upper apron, said press having an inlet portion and an outlet portion and pressure means for urging said lower run of said upper apron and said upper run of said lower apron together to squeeze materials therebetween; drive means for driving said aprons at the same speed, said drive means including sprockets directly engaging the steel links of said aprons; side wall links on said lower apron along each side of said horizontal run between said inlet and outlet portions and flaring outwardly along an upper edge thereof for confining the material between said aprons, said side wall links having overlapping vertical projections forming a continuous retaining wall on each side of said aprons between said inlet portion and said outlet portion; and means for moving said side-wall means at the same speed as said aprons.

References Cited in the file of this patent

UNITED STATES PATENTS

| Re. 22,200 | Richardson | Oct. 13, 1942 |
| 255,896 | Stevens | Apr. 4, 1882 |
| 579,336 | Baumann | Mar. 23, 1897 |
| 639,797 | Walters | Dec. 26, 1897 |
| 1,153,103 | Neale | Sept. 7, 1915 |
| 1,224,993 | Anderson | May 8, 1917 |
| 1,845,676 | McNamara | Feb. 16, 1932 |
| 2,041,891 | White | May 26, 1936 |
| 2,135,763 | Nicholson | Nov. 8, 1938 |
| 2,281,860 | Renault | May 5, 1942 |
| 2,675,053 | Clemens | Apr. 13, 1954 |
| 2,711,130 | Guettler | June 21, 1955 |
| 2,868,245 | Ernst | Jan. 13, 1959 |

FOREIGN PATENTS

| 388,465 | France | June 1, 1908 |
| 414,515 | France | June 21, 1910 |
| 582,612 | France | Oct. 17, 1924 |
| 253,752 | Germany | Nov. 14, 1912 |